Patented Sept. 8, 1931

1,822,533

UNITED STATES PATENT OFFICE

FREDERICK G. LASHER, OF BROOKLYN, NEW YORK

PRINTING INK

No Drawing.     Application filed February 1, 1929. Serial No. 336,923.

My invention relates to printing inks and refers particularly to printing inks adapted for rotogravure printing.

Among the characteristics desirable, or necessary, in rotogravure inks are uniformity of mixture, ability to produce clear impressions, freedom from drying upon the rollers, capable of fixation upon the paper, readily driable upon the paper, comparatively non-inflammable under the conditions of use and freedom from ingredients that will corrode the copper printing cylinder.

Numerous attempts have been made to produce an ink having the above-mentioned properties but thus far all such attempts have been unsuccessful.

I have, however, produced an ink having all of the above desirable characteristics, its properties resulting from the ingredients I employ and from the fact that it is a water in oil type of emulsion as opposed to the oil in water type of emulsions previously suggested for this purpose.

The use of alkalies in rotogravure inks is objectionable because of its corroding effect upon the copper cylinders. The use of non-volatile oils, such as kerosene or a liquid asphalt in combination with gilsonite, or similar compounds, is objectionable as it requires a passage over a heated surface to effect drying and the combination of the ink with the paper, thus producing unsatisfactory results where a hot air blast is employed as the drying means. An oil in water type of ink is objectionable because it requires a large amount of adhesive to quickly fix the ink to the paper.

The ink of my invention overcomes all of the above-mentioned, and other objectionable properties and presents an ink, while containing a large percentage of water, and hence, practically non-inflammable, does not rely on casein, starch, gum arabic or similar emulsifying agents requiring the use of antiseptics to prevent putrefaction.

Neither does my ink require the use of non-volatile oils, or liquid asphalts in order to lower the melting point of the gilsonite sufficiently to cause it to adhere to the paper when warmed during the printing process.

Neither does my ink contain any alkali, or other material, which will corrode the copper cylinders.

The ink of my invention is an emulsion in which a solution of gilsonite, cumarone-indene resins, ester gums and similar compounds in xylol, petroleum-benzene or other suitable solvent constitutes the outside, or continuous, phase and in which the watery portion of the ink is the inside, or dispersed, phase.

I have found that an emulsion of this type will take to, or combine, with the surface of the special paper used in this form of printing, will give strong impressions from the faintest highlights to the deepest shadows and which are on drying with, or without, artificial heat practically fast to water.

The emulsion thus produced is permanent and will stand storage without separation of water or settling of the pigment and that it can be readily thinned to any desired working consistency and after thinning remains as permanent an emulsion as the original from which it was produced.

The method of producing my improved ink is as follows:—

I first prepare a solution of an insoluble metallic soap, preferably a compound of an alkaline earth metal with a fatty acid such as oleic, stearic, or other fatty acids, which metallic compound is insoluble in water but soluble in either volatile or non-volatile compounds, which compounds are also solvents for gilsonite, rosin, cumarene-indene resins or the oil soluble type of condensation resins.

A definite proportion of such metallic soap is dissolved in a volatile solvent, preferably xylol, in definite proportion, either with or without the aid of heat. In this solution a certain quantity of gilsonite, or any of the other binders herein mentioned, is dissolved by the aid of heat and under reflux. The pigment which governs the color of the ink is mixed with the asphaltic or resinous solution and the mass can then be ground or milled in a suitable grinding apparatus in order to reduce the pigment to a fine state of division, after which a certain proportion of water, which may equal three times the volume of the volatile oil or solvent used in dissolving the gum or resin and the metallic soap, is gradually added while the mass is being rapidly stirred. The water added may also have dissolved in it a certain proportion of a water soluble aniline color used to influence or tone the finished color. This produces with the metallic soap the fatty acid lake of the color used which in turn dissolves in the xylol. The stirring or agitation of the ink is continued until a permanent emulsion is produced of the water in oil type and which may be recognized as such by its affinity for xylol instead of water according to well known methods of determining the phase form of emulsions.

As an example I proceed as follows:—

I take 62 parts of dry barium oleate and dissolve it in 540 parts of xylol and in this solution 360 parts of gilsonite are dissolved and the solution mixed with 37 parts of para red roner and 10 parts of carbon black. This is then ground in a roller printing ink mill until the pigment is sufficiently finely divided. I next weigh 1520 parts of water and heat it to a temperature of 180° F. in which I dissolve 15 parts of Bismarc brown and 1 part of methylene blue. I then stir the hot solution into the ground color mass, adding the aqueous solution gradually and stirring until a permanent emulsion, identified by the previously given tests, results.

Volatile solvents other than xylol may be used, among which are benzol and toluol.

Among the agents which may be used to bind the pigment to the paper when the ink is printed thereon, and herein referred to as binders, are gilsonite, cumarene-indene resins and any other suitable condensation product which is insoluble in alcohol but soluble in xylol, benzol, toluol or petroleum benzene.

I do not limit myeslf to the particular chemicals, quantities, temperatures or steps of procedure particularly set forth as these are given simply as a means for clearly describing my invention.

What I claim is:—

1. In a printing ink, a water in oil type of emulsion containing a water insoluble metallic soap, xylol, gilsonite, water and a pigment.

2. In a printing ink, a water in oil type of emulsion containing barium oleate, xylol, gilsonite, water and a pigment.

Signed at New York city, in the county of New York, and State of New York, this 30th day of January, 1929.

FREDERICK G. LASHER.